(12) United States Patent
Tomiyama

(10) Patent No.: US 6,837,347 B2
(45) Date of Patent: Jan. 4, 2005

(54) LOCKUP DEVICE FOR FLUID-TYPE TORQUE TRANSMISSION DEVICE

(75) Inventor: Naoki Tomiyama, Hirakata (JP)

(73) Assignee: Exedy Corporation, Osaka (JP)

( * ) Notice: Subject to any disclaimer, the term of this patent is extended or adjusted under 35 U.S.C. 154(b) by 10 days.

(21) Appl. No.: 10/375,172

(22) Filed: Feb. 28, 2003

(65) Prior Publication Data

US 2003/0173176 A1 Sep. 18, 2003

(30) Foreign Application Priority Data

Mar. 15, 2002 (JP) .................................... 2002-073008

(51) Int. Cl.[7] ............................................. F16H 45/02
(52) U.S. Cl. .................................... 192/3.29; 192/212
(58) Field of Search .......................... 192/3.29, 212, 192/70.28

(56) References Cited

U.S. PATENT DOCUMENTS 4,926,988 A * 5/1990 Kundermann ............... 192/212
5,407,041 A * 4/1995 Fukunaga et al. ......... 192/3.29
5,826,688 A * 10/1998 Arhab et al. ............... 192/3.29
6,012,558 A * 1/2000 Kundermann .............. 192/3.29
6,247,568 B1 * 6/2001 Takashima et al. ........ 192/3.29
6,390,263 B1 * 5/2002 Arhab ........................ 192/3.29

FOREIGN PATENT DOCUMENTS

WO    WO 00/19126 A1 * 4/2000

* cited by examiner

Primary Examiner—Rodney H. Bonck
(74) Attorney, Agent, or Firm—Shinjyu Global IP Counselors, LLP

(57) ABSTRACT

A lockup device 7 is provided with a plurality of friction surfaces to absorb and damp torsional vibrations to increase capacity. The lockup device 7 functions both as a clutch and as an elastic coupling mechanism. The lockup device 7 has a clutch plate 71, a drive plate 72, a driven plate 73, a plurality of torsion springs 74, a piston 75, and a piston coupling mechanism 76. The clutch plate 71 has a friction coupling part 71c and a cylindrical part 71b for bearing the centrifugal load of the torsion springs 74. The internal surface of the cylindrical part 71b of the clutch plate 71 bears the radially outward facing part of each torsion spring 74 directly. More specifically, the outward facing parts of the torsion springs 74 are born by increasing only the thickness of the cylindrical part 71b of the clutch plate 71.

20 Claims, 12 Drawing Sheets

LOCKUP DEVICE FOR FLUID-TYPE TORQUE TRANSMISSION DEVICE

BACKGROUND OF THE INVENTION

1. Field of the Invention

The present invention relates to a lockup device for a fluid-type torque transmission device. More specifically, the present invention relates to a lockup device provided in a fluid-type torque transmission device equipped with a front cover having a friction surface, an impeller that is fixed to the front cover and forms a fluid chamber, and a turbine arranged opposite the impeller inside the fluid chamber.

2. Background Information

A conventional torque converter has three types of bladed wheels (an impeller, a turbine, and a stator) arranged therein. A torque converter is one type of fluid-type torque transmission device because it transmits torque through a fluid enclosed therein. A torque converter is often provided with a lockup device. The lockup device is usually disposed in the space between the turbine and the front cover inside the fluid chamber formed by the front cover and the impeller. The lockup device is a mechanism that serves to couple mechanically the front cover and the turbine together such that torque can be transmitted directly from the front cover to the turbine. A conventional lockup device has a circular disc-shaped piston, a drive plate, a driven plate, and a torsion spring. The piston can be pressed against the front cover. The drive plate is fixed to an outer circumferential part of the piston. The driven plate is fixed to the turbine. The torsion spring serves to couple the drive plate and the driven plate together elastically in the rotational direction. The torsion spring is supported at both rotationally facing ends and at its outside circumference by either the drive plate or the driven plate. The torsion spring is also supported at both rotationally facing ends by either the driven plate or the drive plate (whichever does not support the outside circumference of the torsion spring).

When the lockup device is engaged, torque is transmitted from the front cover to the piston and from the piston to the turbine through the torsion spring. The torsion spring is compressed in the rotational direction between the drive plate and the driven plate and acts to absorb and damp torsional vibrations.

There have already been proposals for a lockup device that has a plurality of friction surfaces to increase the torque transmission capacity. One such device has an elastic coupling mechanism joined to the turbine, a drive plate that serves as the input part of the elastic coupling mechanism, a clutch plate provided with a friction coupling part, and a piston that serves to press the friction coupling part of the clutch plate against the front cover. The clutch plate is disposed so as to be sandwiched axially between the piston and the front cover. The elastic coupling mechanism of the lockup device chiefly has the drive plate, a torsion spring, and a driven plate. The drive plate is made of two plates arranged on both axially facing sides of the driven plate and supports the outside circumference and rotationally facing ends of the torsion springs with window parts that are formed therein so as to be arranged circumferentially. The driven plate has angled holes formed therein so as to correspond to the window parts in the drive plate. The torsion springs can be compressed in the rotational direction between the rotationally facing edges of the window parts of the drive plate and the rotationally facing edges of the angled holes of the driven plate. The clutch plate is fixed to the outside edge parts of the drive plate or, more specifically, the outside of the drive plate that corresponds to the window parts in the radial direction.

There is a demand for increasing the capacity of this kind of lockup device to absorb and damp torsional vibrations. One feasible way of meeting this demand is to position the torsion springs further to the outside in the radial direction. However, the drive plate has window parts for holding the torsion springs and bearing their centrifugal loads and the clutch plate is fixed to the drive plate at a portion located radially to the outside of the window parts. Consequently, it is difficult to move the radial position of the torsion springs further to the outside. Thus, the torsional vibration absorbing/damping capacity of the lockup device cannot be increased.

In view of the above, it will be apparent to those skilled in the art from this disclosure that there exists a need for an improved a lockup device provided for a fluid-type torque transmission device. This invention addresses this need in the art as well as other needs, which will become apparent to those skilled in the art from this disclosure.

SUMMARY OF THE INVENTION

An object of the present invention is to increase the capacity of a lockup device provided with a plurality of friction surfaces to absorb and damp torsional vibrations.

A lockup device for a fluid-type torque transmission device in accordance with a first aspect of the present invention is equipped with a front cover, an impeller, and a turbine. The front cover has a friction surface. The impeller is fixed to the front cover and forms a fluid chamber therewith. The turbine is arranged opposite the impeller inside the fluid chamber. The lockup device is equipped with a clutch member, a drive member, a driven member fixed to the turbine, an elastic member, and a piston. The clutch member has a friction coupling part that can be pressed against the friction surface of the front cover. The drive member mates with the clutch member in such a manner that it cannot rotate relative to the clutch member. The elastic member elastically couples the drive member and the driven member together in the rotational direction. The piston is arranged between the front cover and the turbine and serves to press the friction coupling part against the friction surface. The clutch member also has a bearing part that can bear a centrifugal load of the elastic member.

Since the clutch member of this lockup device is provided with a bearing part for bearing the centrifugal load of the elastic member, it is not necessary to provide a section on the drive member or driven member in the conventional manner for bearing the radially outward facing part of the elastic member.

A lockup device for a fluid-type torque transmission device in accordance with a second aspect of the present invention is the device of the first aspect, wherein a ring member is installed in the section where the drive member and clutch member mate in order to position the clutch member at a prescribed axial position with respect to the drive member. Since this lockup device for a fluid-type torque transmission device uses a ring member to position the clutch member with respect to the drive member in the axial direction, it is easy to position the friction coupling part of the clutch member to a prescribed position axially between the piston and the friction surface of the front cover. As a result, the lockup device is easier to assemble.

A lockup device for a fluid-type torque transmission device in accordance with a third aspect of the present invention is the device of the first or second aspects, wherein the clutch member is positioned in the radial direction by the drive member.

With this lockup device for a fluid-type torque transmission device, the radial position of the clutch member is stable because the clutch member is positioned in the radial direction by the drive member.

A lockup device for a fluid-type torque transmission device in accordance with a fourth aspect of the present invention is the device of any one of the first to third aspects, wherein the driven member limits the rotation of the drive member to a prescribed angular range when the drive member rotates relative to the driven member. With this lockup device for a fluid-type torque transmission device, any desired torsional characteristic can be obtained because the compression of the elastic member disposed between the drive member and the driven member can be limited to a prescribed angular range.

A lockup device for a fluid-type torque transmission device in accordance with a fifth aspect of the present invention is the device of any one of the first to fourth aspects, wherein the radially outward facing part of the elastic member touches against the internal surface of the bearing part. With this lockup device for a fluid-type torque transmission device, there is no need to provide the drive member or driven member with a section for bearing the radially outward facing part of the elastic member because the internal surface of the bearing part of the clutch member bears the outward facing part of the elastic member directly.

A lockup device for a fluid-type torque transmission device in accordance with a sixth aspect of the present invention is the device of any one of the first to fifth aspects, wherein the driven member has a first driven member and a second driven member. The first driven member holds the elastic member. The second driven member is fixed to the turbine and mates with the first driven member in such a manner that it cannot rotate relative to the first driven member but can move in the axial direction relative to the first driven member. The driven member of this lockup device for a fluid-type torque transmission device is divided into a first driven member that holds the elastic member and a second driven member that is fixed to the turbine. Consequently, the lockup device can be assembled using a procedure in which an assemblage including the clutch member, the elastic member, the drive member, and the first driven member is assembled in advance and then the second driven member, which is fixed to the turbine, is mated to the assemblage. In short, the axial positioning of the clutch member and drive plate can be adjusted before installing the turbine. As a result, the lockup device is easier to assemble.

A lockup device for a fluid-type torque transmission device in accordance with a seventh aspect of the present invention is the device of the sixth aspect, wherein the first driven member is positioned in the radial direction by the second driven member. With this lockup device for a fluid-type torque transmission device, the radial position of the first driven member is stable because the first driven member is supported by the second driven member in the radial direction.

A lockup device for a fluid-type torque transmission device in accordance with an eighth aspect of the present invention is the device of any one of the first to fourth aspects, wherein the drive member has a holding part that holds the elastic member and the portion of the holding part that holds the radially outward facing part of the elastic member touches against the internal surface of the bearing part. With this lockup device for a fluid-type torque transmission device, it is not necessary to provide the drive member with sufficient rigidity to bear the centrifugal load of the elastic member by itself because the centrifugal load of the elastic member is born by the bearing part of the clutch member as well as the portion of the drive member that supports the radially outward facing part of the elastic member. As a result, the wall thickness of the drive member can be reduced and the elastic member can be positioned further to the outside in the radial direction.

A lockup device for a fluid-type torque transmission device in accordance with an ninth aspect of the present invention is the device of any one of the first to fourth and eighth aspects, wherein the drive member is positioned in the radial direction by the driven member.

With this lockup device for a fluid-type torque transmission device, the radial position of the drive member with respect to the driven member is stable because the drive member is supported by the driven member.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Below, a first preferred embodiment of the present invention is described based on the drawings.

(1) Basic Structure of Torque Converter

Figure 1:
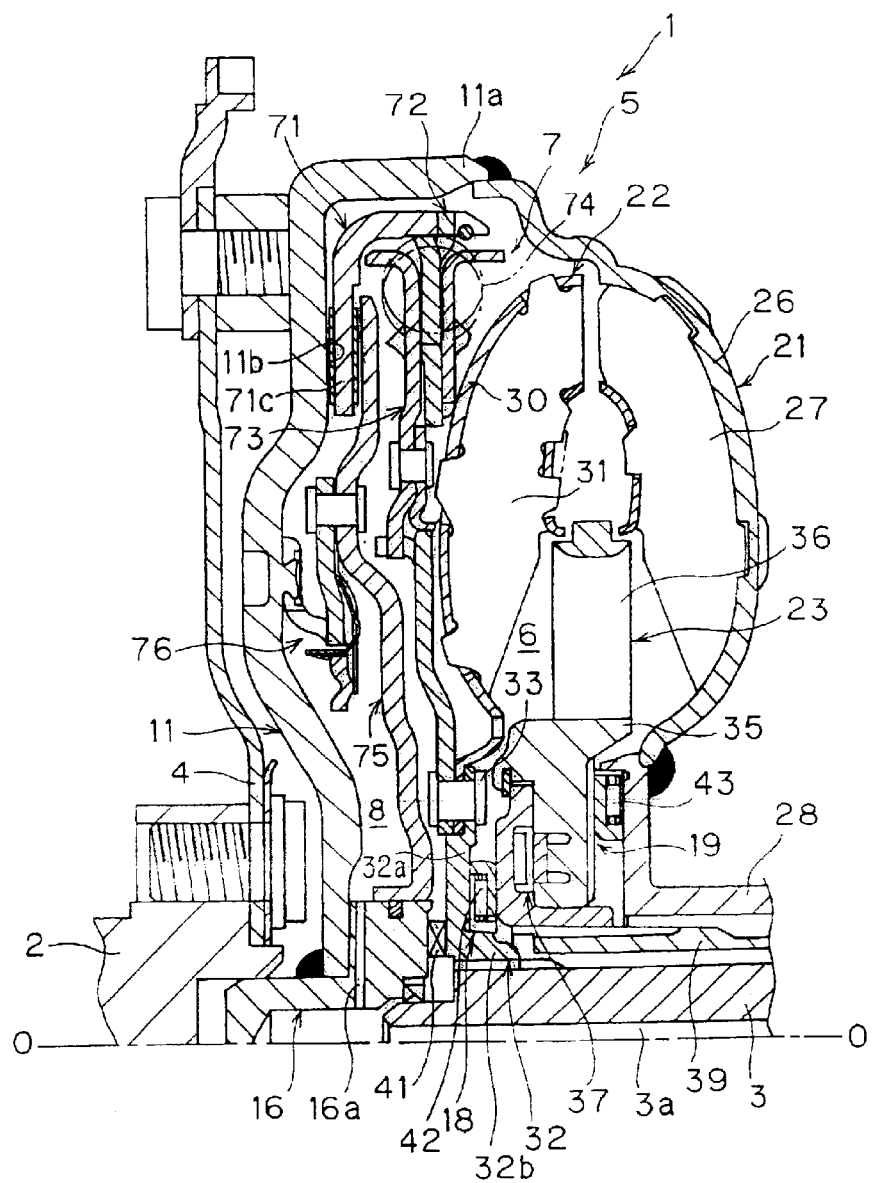
FIG. 1 is a vertical cross-sectional schematic view a torque converter having a lockup device in accordance with a first preferred embodiment of the present invention.

FIG. 1 illustrates a vertical cross sectional schematic view of a torque converter 1 in accordance with the first preferred embodiment. The torque converter 1 serves to transmit torque from a crankshaft 2 of an engine to an input shaft 3 of a transmission. The engine, which is not shown in the Figures, is arranged on the left side of FIG. 1 and the transmission, which also is not shown, is arranged on the right side of FIG. 1. The line O—O shown in FIG. 1 is the rotational axis of the torque converter 1.

The torque converter 1 chiefly has a flexible plate 4 and a torque converter main body 5. The flexible plate 4 is made of a thin, circular disc-shaped member and serves both to transmit torque and to absorb bending vibrations transmitted to the torque converter main body 5 from the crankshaft 2. Therefore, the flexible plate 4 is provided with sufficient rigidity in the rotational direction for transmitting torque but its rigidity is relatively low in the bending or axial direction.

The torque converter main body 5 is equipped with a front cover 11, three types of bladed wheels, and a lockup device 7. An outer circumferential part of the flexible plate 4 is fixed to the front cover 11. The three types of bladed wheels include an impeller 21, a turbine 22, and a stator 23. A fluid chamber defined by the front cover 11 and the impeller 21 is filled with a fluid and divided into a fluid operating chamber 6 and an annular space 8. The fluid operating chamber 6 is torus shaped and defined by the impeller 21, the turbine 22, and the stator 23. The lockup device 7 is disposed in the annular space 8.

The front cover 11 is a circular disc-shaped body having a roughly cylindrical center boss 16 that extends in the axial direction fixed to an inside circumferential part thereof by welding or the like. The center boss 16 is inserted into a center hole of the crankshaft 2 in an axial direction. An outer cylindrical part 11a that extends toward the transmission is formed on an outer circumferential part of the front cover 11. The outer circumferential rim of an impeller shell 26 of the impeller 21 is fixed to the tip of the outer cylindrical part 11a by welding or the like. The front cover 11 and the impeller 21 form a fluid chamber, the inside of which is filled with fluid.

The impeller 21 chiefly has the impeller shell 26, a plurality of impeller blades 27, and an impeller hub 28. The impeller blades 27 are fixed to the inside of the impeller shell 26. The impeller hub 28 is fixed by welding or the like to an inner circumferential part of the impeller shell 26.

The turbine 22 is arranged inside the fluid chamber so as to face the impeller 21 in the axial direction. The turbine 22 chiefly has a turbine shell 30, a plurality of turbine blades 31, and a turbine hub 32. The plurality of turbine blades 31 is fixed to the surface of the turbine shell 30 that axially faces the impeller 21. The turbine hub 32 is fixed to the inner circumferential rim of the turbine shell 30. The turbine hub 32 has a flange part 32a and a boss part 32b. The turbine shell 30 and the turbine hub 32, as well as a driven plate 73 (discussed later), are fixed together with a plurality of rivets 33 at the flange part 32a of the turbine hub 32. Splines that mate with the input shaft 3 are formed on the internal surface of the boss part 32b of the turbine hub 32. Thus, the turbine hub 32 is arranged to rotate integrally with the input shaft 3.

The stator 23 is installed axially between an inner circumferential part of the impeller 21 and an inner circumferential part of the turbine 22. The stator 23 serves to redirect the flow of the fluid returning to the impeller 21 from the turbine 22. The stator 23 is preferably made of resin or aluminum alloy that has been cast as a single unit. The stator 23 chiefly has a ring-shaped stator carrier 35 and a plurality of stator blades 36 provided on the outer circumferential surface of the stator carrier 35. The stator carrier 35 is supported by a cylindrical stationary shaft 39 with a one-way clutch 37 disposed therebetween. The stationary shaft 39 extends axially toward the transmission between the outer circumferential surface of the input shaft 3 and the inner circumferential surface of the impeller hub 28.

A fluid passage 16a through which fluid can pass in the radial direction is formed in the center boss 16. The fluid passage 16a provides communication between the space on the inside of the center boss 16 that communicates with a center hole 3a of the input shaft 3 and the space 8 on the outside of the center boss 16. A first thrust bearing 41 is disposed axially between the center boss 16 and the turbine hub 32 and bears a thrusting force that is produced due to the rotation of the turbine 22. A second thrust bearing 42 is disposed between the turbine hub 32 and an inner circumferential part of the stator 23 (more specifically, the one-way clutch 37). In the section where the second thrust bearing 42 is provided, a first port 18 is formed which allows fluid to communicate in the radial direction between both sides thereof. In short, the first port 18 links the fluid operating chamber 6 with the fluid passage between the input shaft 3 and the stationary shaft 39. There is also a third thrust bearing 43 disposed axially between the stator 23 (more specifically, the stator carrier 35) and the impeller 21 (more specifically, the impeller hub 28). In the section where the third thrust bearing 43 is provided, a second port 19 is formed which allows fluid to communicate in the radial direction between both sides thereof. In short, the second port 19 links the fluid operating chamber 6 with the fluid passage between the stationary shaft 39 and the impeller hub 28. Also, each fluid passage is connected to a hydraulic circuit (not shown) and fluid can be supplied and discharged to and from each of the fluid passage 16a and the ports 18 and 19 independently.

(2) Structure of Lockup Device

Figure 2:
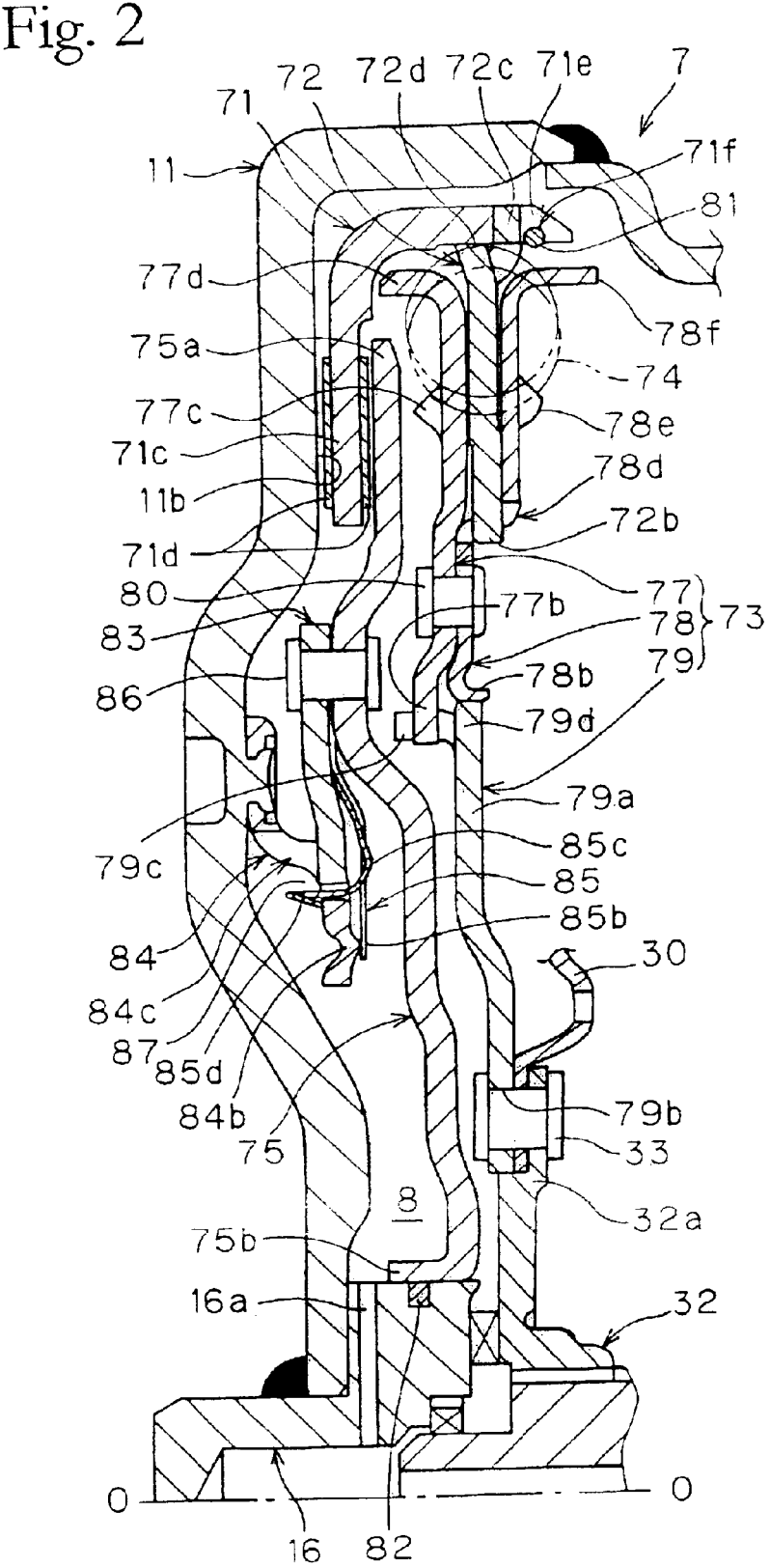
FIG. 2 is an enlarged partial view of FIG. 1 showing a cross-sectional view of the lockup device.
Figure 3:
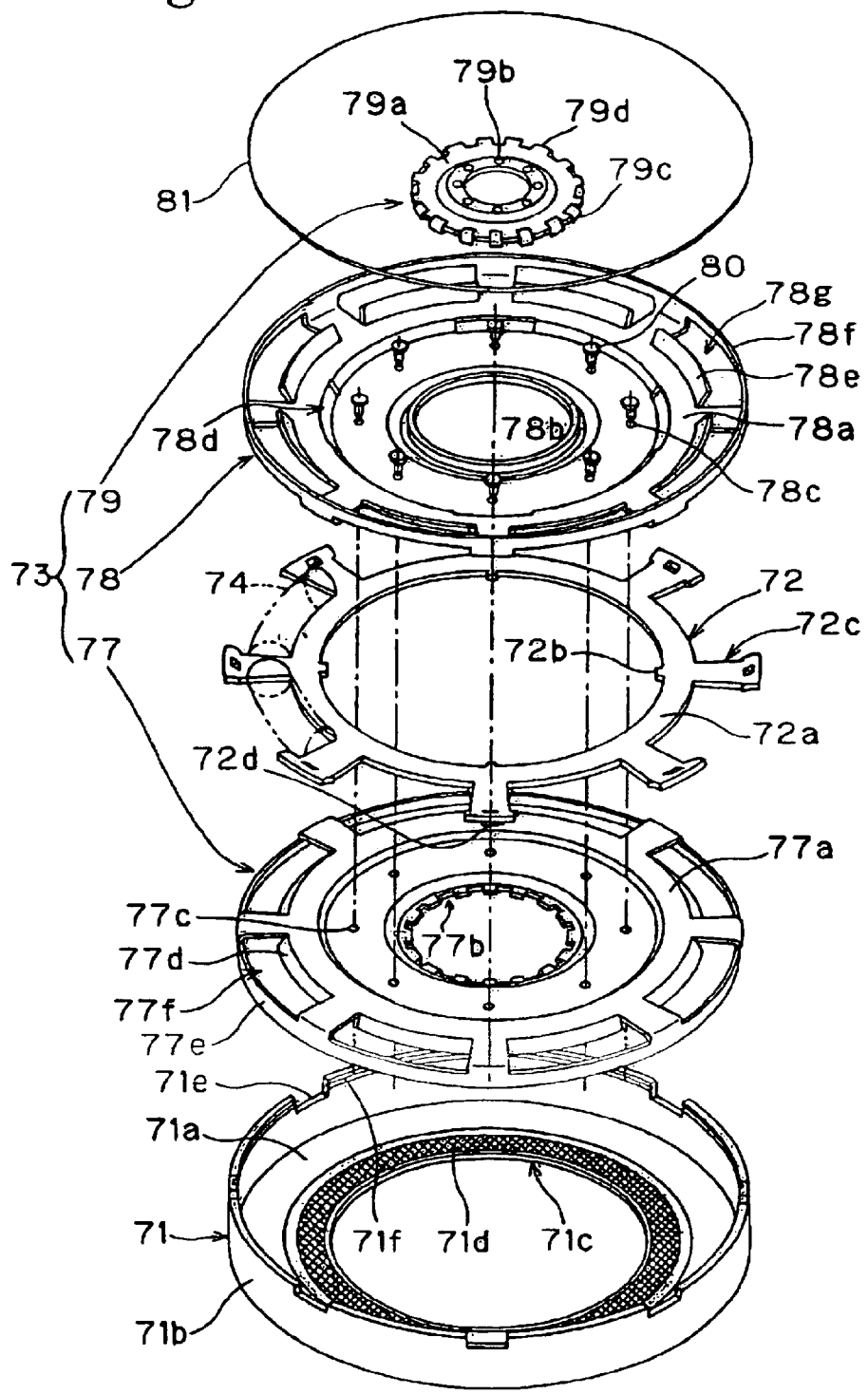
FIG. 3 is an exploded perspective view of components that are included in the lockup device such as, a clutch plate, a drive plate, a driven plate, and a ring member.
Figure 4:
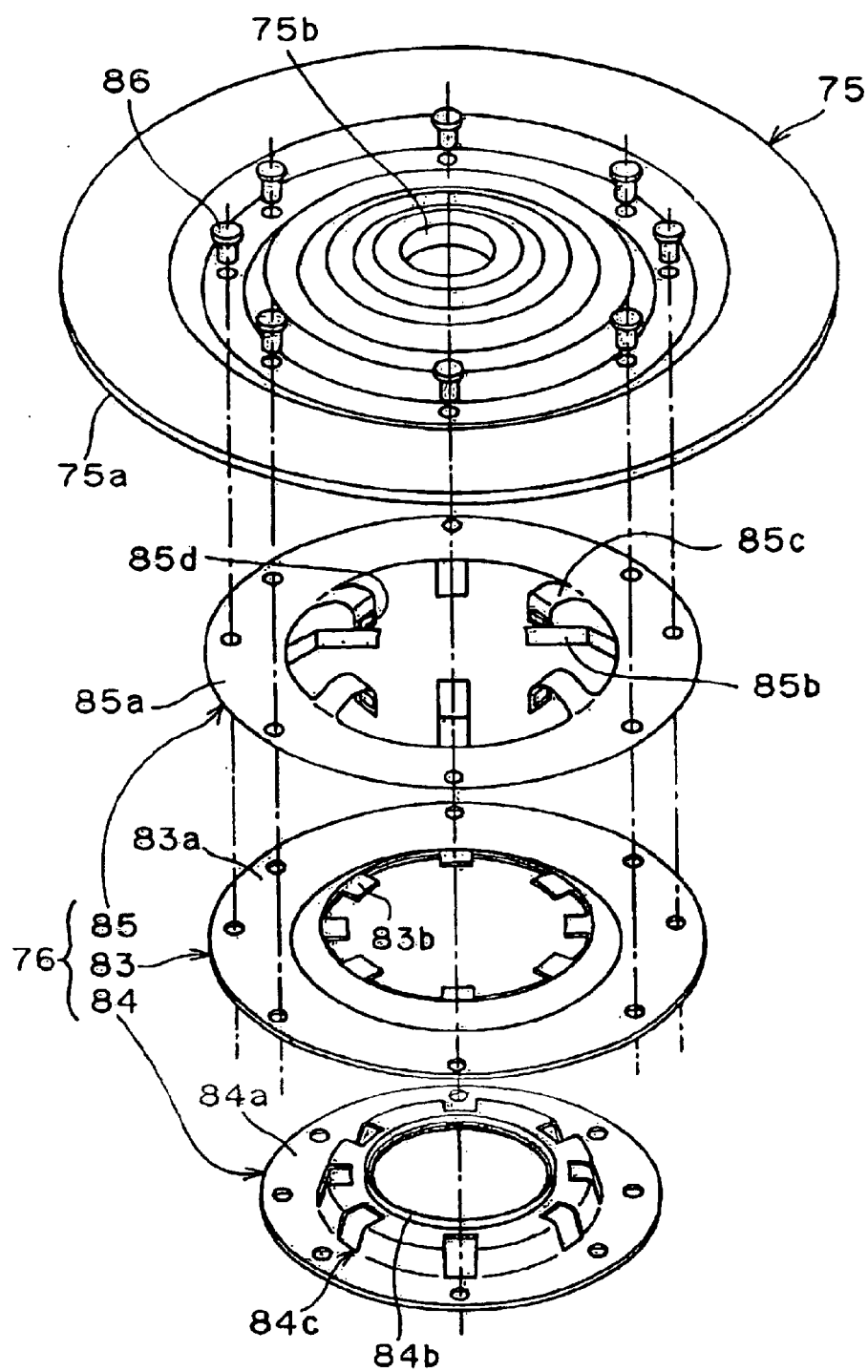
FIG. 4 is an exploded perspective view of a piston and a piston coupling mechanism of the torque converter.

The lockup device 7 is arranged in the space 8 between the turbine 22 and the front cover 11 and serves to couple mechanically the turbine 22 and the front cover 11 together when necessary. The lockup device 7 has both a clutch function and an elastic coupling function. The lockup device 7 chiefly has a clutch plate 71 (clutch member), a drive plate 72 (drive member), the driven plate 73 (driven member), a plurality of torsion springs 74 (elastic members), a piston 75, and a piston coupling mechanism 76. FIG. 2 is a cross-sectional view of the portion of the torque converter 1 that contains the lockup device 7. FIG. 3 is an exploded perspective view of the clutch plate 71, the drive plate 72, the driven plate 73, and the plurality of the torsion springs 74 of the lockup device 7. FIG. 4 is an exploded perspective view of the piston 75 and the piston coupling mechanism 76.

Driven Plate

Referring to FIGS. 2 and 3, the driven plate 73 has first driven plates 77 and 78 (first driven member) and a second driven plate 79 (second driven member).

The second driven plate 79 is an annular plate member having an annular part 79a, a plurality of holes 79b, a plurality of claw parts 79c, and a plurality of protrusions 79d. The plurality of holes 79b is formed in an inner circumferential part of the annular part 79a. The plurality of claw parts 79c is arranged circumferentially on the outside edge of the annular part 79a. The plurality of protrusions 79d is formed circumferentially between the claw parts 79c. The claw parts 79c are cut and raised into shapes that point toward the engine in the axial direction. The protrusions 79d project radially outward from an outside circumferential edge of the annular part 79a. The second driven plate 79 is fixed along with the turbine shell 30 to the flange part 32a of the turbine hub 32 with a plurality of rivets 33 that pass through holes 79b. The first driven plates 77 and 78 are fixed together by a plurality of rivets 80 to form a single annular plate member that mates with the second driven plate 79 in such a manner as to rotate integrally therewith.

The first driven plate 77 has an annular part 77a, a plurality of recessions 77b formed in the inside radial edge of the annular part 77a, and a cylindrical part 77e that extends from the outside radial edge of the annular part 77a toward the engine in the axial direction. The annular part 77a has a plurality of holes 77c (through which the rivets 80 pass) formed further to the outside in the radial direction than the recessions 77b and a plurality of cut-and-raised parts 77d formed further to the radial outside than the holes 77c. There are preferably eight cut-and-raised parts 77d in this embodiment and they are cut and raised so as to slant toward the engine in the axial direction. A plurality (preferably eight in this embodiment) of window parts 77f whose openings face in the axial directions are formed radially between the cut-and-raised parts 77d and the cylindrical part 77e. The recessions 77b are shaped so as to recess from the inside edge of the annular part 77a toward the outside in the radial direction and mate with the claw parts 79c of the second driven plate 79 such that the two plates cannot rotate relative to each other.

The first driven plate 78 is disposed on the axial transmission side of the first driven plate 77. The first drive plate 78 has an annular part 78a, a cylindrical part 78b that extends toward the transmission in the axial direction from the radial inside edge of the annular part 78a, and a cylindrical part 78f that extends toward the transmission in the axial direction from the outside edge of the annular part 78a. The annular part 78a has a plurality of holes 78c (through which the rivets 80 pass) formed further to the outside in the radial direction than the recessions 78b and a plurality of cut-and-raised parts 78e formed radially further to the radial outside than the holes 78c. At a portion located approximately midway with respect to the radial direction, the annular part 78a also has a plurality (preferably four in this embodiment) of window parts 78d having cut-out openings arranged circumferentially with spaces therebetween. The portion of the annular part 78a where the window parts 78d are formed is bent toward the transmission in the axial direction. In short, the window parts 78d are shaped like angled holes whose openings are slanted with respect to the radial direction. A plurality of window parts 78g whose openings face in the axial directions are provided radially between the cut-and-raised parts 78e and the cylindrical part 78f. There are preferably eight window parts 78g in this embodiment and these window parts 78g are arranged so as to correspond to eight window parts 77f of the first driven plate 77. Also, the window parts 78d are arranged so as to correspond to the circumferential portions between the window parts 77f and 78g.

The internal surface of the cylindrical part 78b fits around the radial outside of the protrusions 79d of the second driven plate 79. Further, the first driven plates 77 and 78 are positioned in the radial direction by the second driven plate 79. The first driven plates 77 and 78 are constituted such that they can rotate as a single unit, and they mate with the second driven plate 79 such that they can move in the axial direction with respect to the second driven plate 79 but cannot rotate relative to the second driven plate 79.

Torsion Springs

The torsion springs 74 have a plurality (preferably eight in this embodiment) of coil springs arranged in the window parts 77f and 78g. The axially facing sides thereof are supported by the cut-and-raised parts 77d and 78e of the first driven plates 77 and 78 and the rotationally facing ends thereof are supported either directly or through a spring seat on the rotationally facing edge sections of the window parts 77f and 78g, which serve as torque transmission parts.

Drive Plate

The drive plate 72 is a member that can transmit torque to torsion spring 74 and is interposed axially between the first driven plates 77 and 78. The drive plate 72 is an annular plate member having an annular part 72a, a plurality of protrusions 72b, and a plurality of claw parts 72c. The protrusions 72b are formed on the inside edge of the annular part 72a. The plurality of claw parts 72c extends radially outward from the outside edge of the annular part 72a. The protrusions 72b, of which there preferably are four in this embodiment, protrude radially inward and are formed so as to correspond to the four window parts 78d formed in the first driven plate 78. The protrusions 72b are arranged so as to extend radially inward through the window parts 78d in such a manner that the rotational angle can be limited when the drive plate 72 and the driven plate 73 rotate relative to each other. More specifically, the protrusions 72b limit the rotational angle by touching against the rotationally facing edge part of the window parts 78d. The claw parts 72c, of which there are preferably eight in this embodiment, are arranged rotationally between the window parts 77f and 78g of the driven plate 73 and touch against the rotationally facing ends of the torsion springs 74. The torsion springs 74 are arranged such that they are compressed rotationally between the drive plate 72 and the driven plate 73. Each claw part 72c has a cut-and-raised part 72d formed by cutting and raising a portion of the claw part 72c toward the engine such that the end face of the cut-and-raised part 72d faces radially outward.

Clutch Plate

The clutch plate 71 functions chiefly as a friction coupling part that couples with and releases from the front cover 11. The clutch plate 71 is installed axially between the driven plate 73 and the front cover 11. The clutch plate 71 is an annular plate member having an annular part 71a and a cylindrical part 71b (bearing part) that extends from the outside edge of the annular part 71a toward the turbine 22 in the axial direction. The inner circumferential portion of the annular part 71a constitutes a friction coupling part 71c and is in close proximity to the friction surface 11b of the front cover 11. Friction facings 71d are attached to both axial surfaces of the friction coupling part 71c. The cylindrical part 71b has a plurality (preferably eight in this embodiment) of recessions 71e and a plurality of grooves 71f. The recessions 71e are formed in the transmission facing edge of the cylindrical part 71b so as to correspond to the claw parts 72c of the drive plate 72. The plurality of grooves 71f is formed in the internal surface of the cylindrical part 71b circumferentially between the recessions 71e. The claw parts 72c mate with the recessions 71e such that relative rotation is not possible. A ring member 81, e.g., a wire ring or snap ring, fits into the grooves 71f. As a result, the claw parts 72c are positioned to a prescribed axial position. In short, the clutch plate 71 is positioned to a prescribed position with respect to the drive plate 72 in the axial direction. The radially outward facing end faces of the cut-and-raised parts 72d of the drive plate 72 fit against the radially internal surface of the cylindrical part 71b. As a result, the clutch plate 71 is positioned in the radial direction by the drive plate 72. Furthermore, the cylindrical part 71b contacts the radially outward facing part of the torsion springs 74 and bears the centrifugal load thereof.

Piston

Referring now to FIGS. 2 and 4, the piston 75 is a circular disc-shaped member with a center hole formed therein and serves to engage and disengage the clutch. The piston 75 is positioned on the outside of the center boss 16. The outer circumferential portion of the piston 75 constitutes a pressing part 75a. The pressing part 75a is a flat, annular section disposed on the transmission side of friction coupling part 71c of the clutch plate 71. Consequently, when the piston 75 moves toward the engine, the pressing part 75a presses the friction coupling part 71c against the friction surface 11b of the front cover 11. Meanwhile, the inner circumferential portion of the piston 75 is provided with a cylindrical part 75b that extends toward the engine in the axial direction. The radially internal surface of the cylindrical part 75b fits around the radially external surface of the center boss 16 such that it can move in the axial direction. A seal ring 82 is provided between the external surface of the center boss 16 and the cylindrical part 75b so that operating fluid does not flow between the engine side of the piston 75 and the transmission side of the piston 75 within the space 8.

Piston Coupling Mechanism

The piston coupling mechanism 76 functions to couple the piston 75 to the front cover 11 in such a manner that the piston 75 rotates integrally with the front cover 11 but can move relative to the front cover 11 in the axial direction. With respect to the radial direction, the piston coupling mechanism 76 is provided at an intermediate position between the pressing part 75a and the cylindrical part 75b of the piston 75. The piston coupling mechanism 76 has a piston lug plate 83, a cover lug plate 84, and a return plate 85. The piston lug plate 83 is an annular plate that is fixed to the engine side of the piston 75 with a plurality of rivets 86. The piston lug plate 83 has an annular part 83a and a plurality of protrusions 83b that projects radially inward from the inside edge of the annular part 83a. The protrusions 83b are arranged circumferentially and there are preferably eight of them in this embodiment. The cover lug plate 84 is an annular plate that is fixed to the turbine side of the front cover 11 by half-punch staking. The cover lug plate 84 has an annular part 84a, an annular protrusion 84b, and a plurality of window parts 84c. The annular protrusion 84b is formed so as to protrude toward the transmission from the inside edge of the annular part 84a. The plurality of window parts 84c has cutout openings arranged circumferentially. The portion of the annular part 84a where the window parts 84c are formed is bent toward an axial direction. Consequently, the window parts 84c, of which there are preferably eight in this embodiment, are shaped like angled holes having a portion that opens in an axial direction and a portion that opens in a radial direction.

The protrusions 83b of the piston lug plate 83 mate with the window parts 84c such that the two lug plates 83 and 84 cannot rotate relative to each other but can move in the axial direction relative to each other. Thus, the piston 75 can move relative to the front cover 11 in the axial direction but not in the rotational direction. When the window parts 84c and the protrusions 83b are in the mated state, a plurality (preferably eight in this embodiment) of slit parts 87, i.e., slit-shaped gaps, is formed between the radially inward facing edges of the protrusions 83b and the inside rims of the window parts 84c.

The return plate 85 is an annular plate that is fixed along with the piston lug plate 83 to the engine side of the piston 75 with rivets 86. The return plate 85 has an annular part 85a, a plurality of protrusions 85b, and a plurality of claw parts 85c. The protrusions 85b project radially inward from the inside edge of the annular part 85a. The plurality of claw parts 85c is formed circumferentially between the protrusions 85b. There are preferably four protrusions 85b in this embodiment and the tips of these protrusions 85b touch against the annular protrusion 84b of the cover lug plate 84. There are preferably four claw parts 85c in this embodiment and each of these claw parts 85c has a portion that extends radially inward from the inside edge of the annular part 85a and a portion that is located further inward in the radial direction and extends toward the engine in the axial direction. The tips of the claw parts 85c (i.e., the portion closer to the engine) are provided with the cut-and-raised parts 85d that catch in the slit parts 87 and serve to limit the movement of the piston 75 toward the transmission in the axial direction. Thus, when the piston 75 moves toward the engine in the axial direction, the return plate 85 can apply a force that pushes the piston 75 toward the transmission in the axial direction because the protrusions 85b deform elastically. Moreover, when the piston 75 moves toward the transmission in the axial direction, the return plate 85 can limit the movement of the piston 75 toward the transmission because the cut-and-raised parts 85d touch against the inner circumferential rim of the window parts 84c of the cover lug plate 84 (more particularly, against the slit parts 87).

(3) Operation of Torque Converter

The operation of the torque converter 1 is described with reference to FIGS. 1 and 2.

Immediately after the engine is started, fluid is supplied to the inside of the torque converter main body 5 through the fluid passage 16a and the second port 19 and fluid is discharged from the first port 18. The fluid supplied through the fluid passage 16a flows radially outward between the front cover 11 and the piston 75 within the space 8. The fluid passes through the axial spaces on both sides of the clutch plate 71 and finally flows into the fluid operating chamber 6. During this process, the piston 75 moves toward the turbine 22 because the hydraulic pressure is higher in the space 8 than in the fluid operating chamber 6 and because of the force applied by protrusions 85b of the return plate 85. The piston 75 stops moving toward the turbine 22 when the cut-and-raised parts 85d of the return plate 85 of the piston coupling mechanism 76 abut against the rim part of the slit parts 87. When the lockup device 7 is disengaged in this manner, torque is transmitted between the front cover 11 and the turbine 22 by the fluid drive between the impeller 21 and the turbine 22. Under these conditions, there are times when changes in the hydraulic pressure within the torque converter 1 cause a force to act on the piston 75 and move it toward the front cover 11. However, since the return plate 85 pushes the piston 75 in the direction of separation from the front cover 11, it is difficult for the piston 75 to move toward the engine.

When the gear ratio of the torque converter 1 increases and the rotational speed of the input shaft 3 reaches a prescribed speed, fluid from the space 8 is discharged through the fluid passage 16a. As a result, the hydraulic pressure of the fluid operating chamber 6 becomes higher than the hydraulic pressure of the space 8 and the piston 75 moves toward the engine. As a result, the pressing part 75a of the piston 75 presses the friction coupling part 71c of the clutch plate 71 against the friction surface 11b of the front cover 11. Since the piston 75 is rotating integrally with the front cover 11 due to the piston coupling mechanism 76, torque is transferred from the front cover 11 to the clutch plate 71. Meanwhile, since the piston lug plate 83 of the piston coupling mechanism 76 is close to the cover lug plate 84 because the piston 75 has moved toward the engine, protrusions 85b of the return plate 85 touch against protrusions 84b of the cover lug plate 84 and deform elastically. The torque of the front cover 11 is transmitted from the drive plate 72 (which is mated integrally with the clutch plate 71) to the driven plate 73 through the torsion springs 74. In short, torque is transmitted from the drive plate 72 to the driven plate 73 through the torsion springs 74. More specifically, the torque is transmitted from the drive plate 72 to the first driven plates 77 and 78 through the torsion springs 74 and then from the first driven plates 77 and 78 to the second driven plate 79, which is mated with the first driven plates 77 and 78 such that it cannot rotate relative to the first driven plates 77 and 78. In other words, the front cover 11 is mechanically coupled with the turbine 22 and the torque of the front cover 11 is imparted directly to the input shaft 3 through the turbine 22. When this occurs, the relative rotation between the drive plate 72 and the first driven plates 77 and 78 causes the torsion springs 74 to be compressed between the rotationally facing edge surfaces of the claw parts 72c of the drive plate 72 and the rotationally facing edge surfaces of the window parts 77f and 78g of the first driven plates 77 and 78. Also, the rotational motion of the drive plate 72 with respect to the first driven plates 77 and 78 is limited to a prescribed angular range by the abutting of the protrusions 72b (provided on the inside circumferential portion of the drive plate) against the rotationally facing edge parts of the windows 78d provided in the first driven plate 78. Since both surfaces of friction coupling part 71c of the clutch plate 71 are provided with the friction facings 71d, the torque transmission capacity is larger than for lockup devices having a single friction surface.

(4) Assembly of Lockup Device

Figure 5:
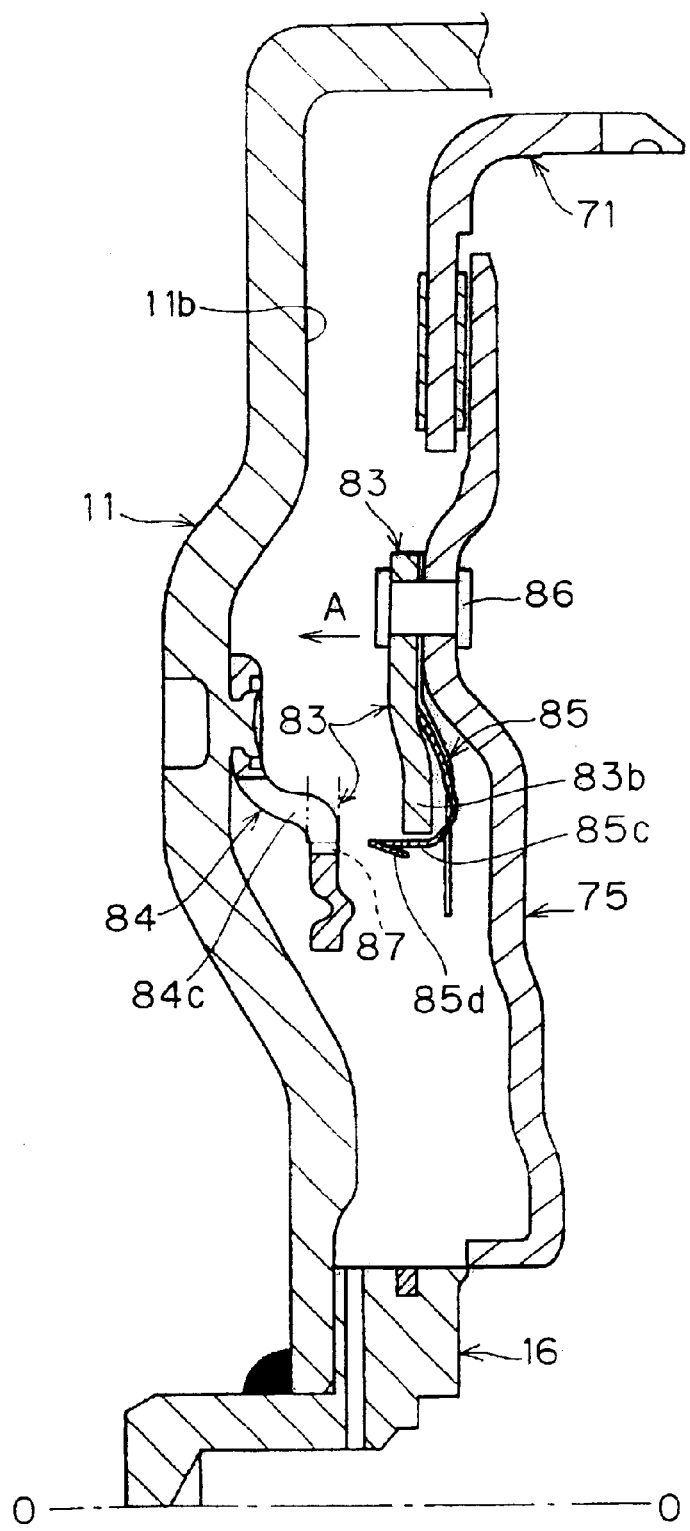
FIG. 5 illustrates the assembly of the piston and piston coupling mechanism.
Figure 6:
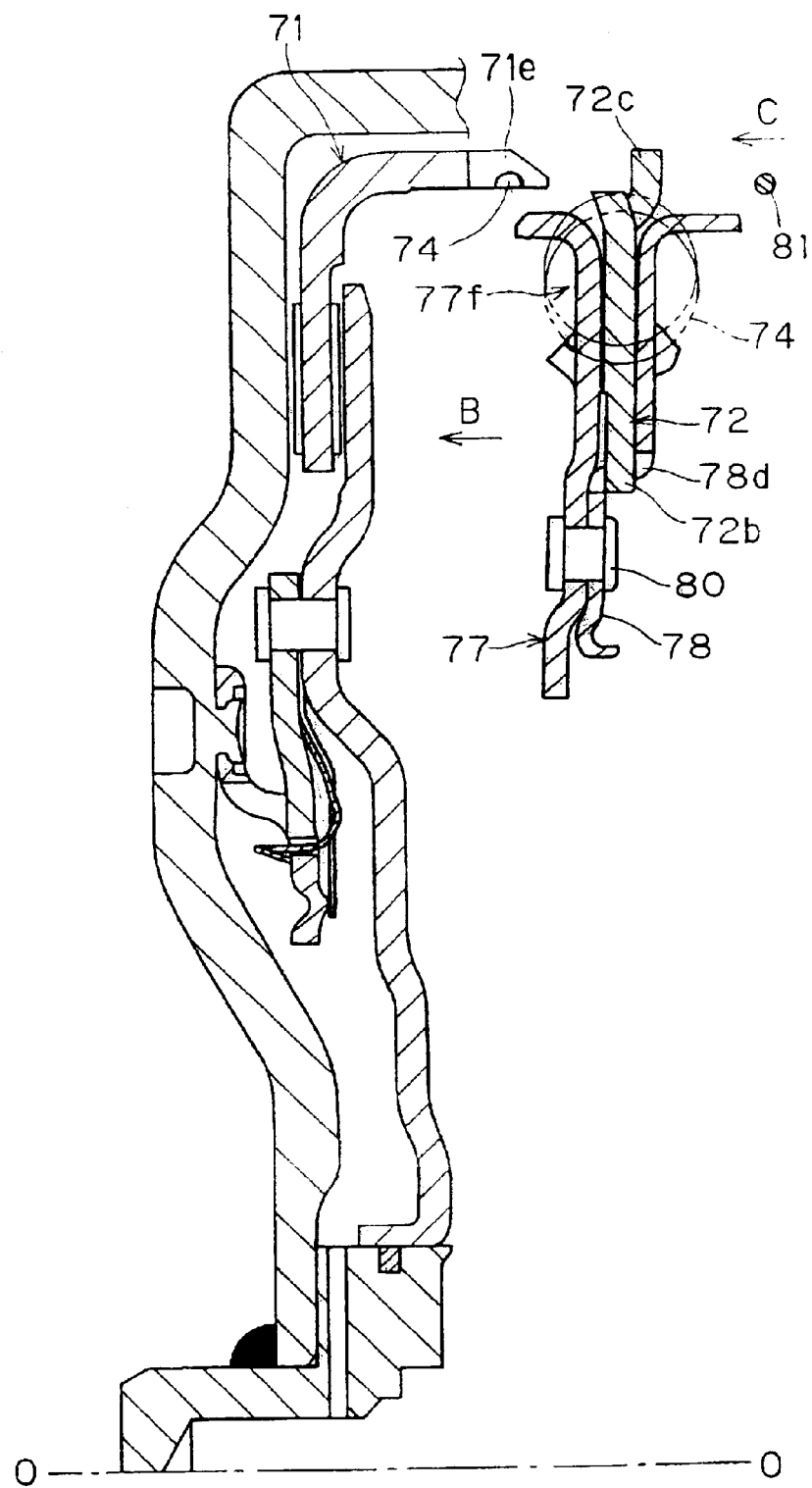
FIG. 6 illustrates the assembly of the drive plate to the clutch plate of the lockup device in accordance with the first preferred embodiment of the present invention.
Figure 7:
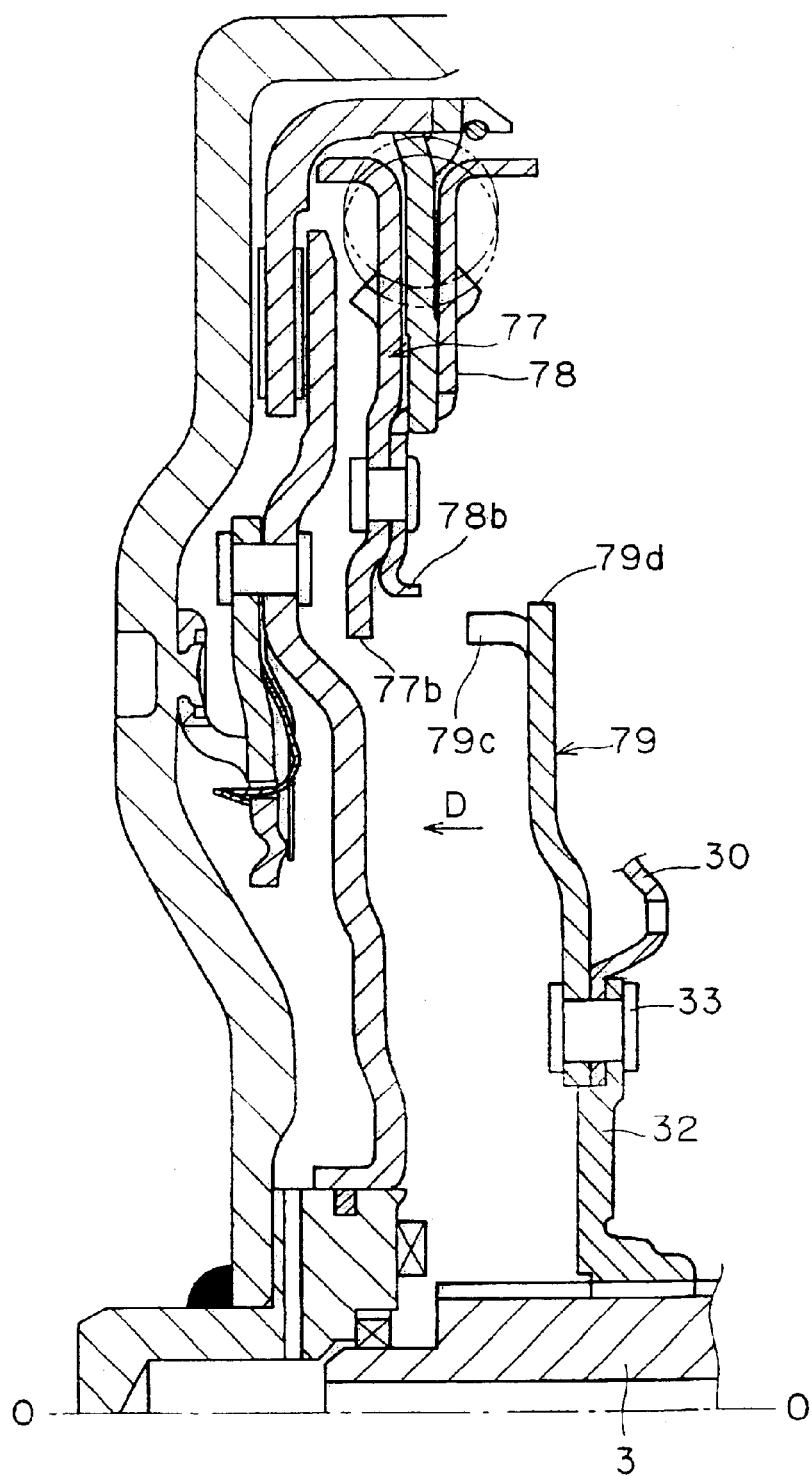
FIG. 7 illustrates the assembly of a second driven plate to first driven plates of the lockup device in accordance with the first preferred embodiment of the present invention.

The assembly of the lockup device 7 is described with reference to FIGS. 5 to 7. FIG. 5 shows the assembly of the piston 75 and the piston coupling mechanism 76. FIG. 6 shows the assembly of the drive plate 72 to the clutch plate 71. FIG. 7 shows the assembly of the second driven plate 79 to the first driven plates 77 and 78. The lockup device 7 is preferably assembled in the following order, assembly of the piston coupling mechanism 76, assembly of the drive plate 72 to the clutch plate 71, and assembly of the second driven plate 79 to the first driven plates 77 and 78. Each procedure is explained below.

Assembly of Piston Coupling Mechanism

As shown in FIG. 5, the cover lug plate 84 is fixed to the front cover 11 at prescribed position by half-punch staking. Meanwhile, the piston lug plate 83 and the return plate 85 are fixed to the piston 75 at a prescribed position with the rivets 86. Next, the piston 75 is fitted onto the external surface of the center boss 16 in the direction of arrow A such that the clutch plate 71 is axially interposed between the pressing part 75a of the piston 75 and the friction surface 11b of the front cover 11. When this is done, the protrusions 83b of the piston lug plate 83 mate with the window parts 84c of the cover lug plate 84. Further, the cut-and-raised parts 85d of the claw parts 85c of the return plate 85 mate with the inner circumferential rim of the window parts 84c while deforming elastically (more specifically, the claw parts 85c of the return plate 85 pass through the slit parts 87—which are formed by the mating of the protrusions 83b and the window parts 84c—and the cut-and-raised parts 85d catch in the slit parts 87). Thus, the piston 75 is mounted to the front cover 11 along with the piston coupling mechanism 76.

Assembly of Drive Plate to Clutch Plate

As shown in FIG. 6, the first driven plates 77 and 78, the drive plate 72, and the torsion springs 74 are assembled together using rivets 80. More specifically, the torsion springs 74 are arranged in the window parts 77f of the first driven plate 77. Further, the drive plate 72 is laid over the first driven plate 77 such that the claw parts 72c are aligned with the spaces rotationally between the torsion springs 74. Then, the first driven plate 78 is laid over the drive plate 72 such that the window parts 78d of the first driven plate 78 are aligned with the protrusions 72b of the drive plate 72. With members 72, 74, 77, and 78 thus in a mutually overlapped state, the first driven plates 77 and 78 are fixed together with the rivets 80 so as to become a single unit.

Next, the drive plate 72 is mated with the clutch plate 71 from the direction of arrow B. More specifically, the claw parts 72c of the drive plate 72 are mated with the recessions 71e of the clutch plate 71 such that the two plates cannot rotate relative to each other. Then, the ring member 81 is fitted into the grooves 71f of the clutch plate 71 from the direction of arrow C such that the drive plate 72 and the clutch plate 71 become a single unit.

Assembly of Second Driven Plate to First Driven Plate

As shown in FIG. 7, the second driven plate 79 is first attached to the turbine hub 32 along with the turbine shell 30 using the rivets 33. Then, the internal part of the turbine hub 32 is fitted over the external part of the input shaft 3 from the direction of arrow D and the second driven plate is mated with the first driven plates 77 and 78. More specifically, the claw parts 79c of the second driven plate 79 are mated with the recessions 77b of the first driven plate 77 such that the two plates cannot rotate relative to each other. Simultaneously, the protrusions 79d of the second driven plate 79 are fitted around the internal portion of the cylindrical part 78b of the first driven plate 78, thus, positioning the second driven plate in the radial direction.

(5) Features of Lockup Device

This embodiment of the lockup device 7 has the following features.

Centrifugal Load of Torsion Springs Born by Clutch Plate

Referring to FIG. 2 in this embodiment of the lockup device 7, the clutch plate 71 (clutch member) is provided with a cylindrical part 71b (bearing part) for bearing the centrifugal load of the torsion springs 74 (elastic members). Since the centrifugal load of the torsion springs 74 is born by the cylindrical part 71b, it is not necessary to provide the drive member or the driven member with a section that allows it to hold the radially outward facing parts of the torsion springs by itself, as is done in conventional lockup devices. Furthermore, the internal surface of the cylindrical part 71b of the clutch plate 71 bears the radially outward facing parts of the torsion springs 74 directly. More specifically, the radially outward facing parts of the torsion springs 74 are born by increasing only the wall thickness of the cylindrical part 71b of the clutch plate 71. Consequently, the first driven plates 77 and 78 are not provided with a section for bearing the radially outward facing parts of the torsion springs 74. It is therefore possible to arrange the torsion springs 74 on the outside with respect to the radial direction and to make the coil diameter of coil springs 74 larger. Furthermore, it is not necessary for the first driven plates 77 and 78 to support the radially outward facing parts of the torsion springs 74 and the thickness of the first driven plates can be reduced, thus reducing the weight of the lockup device 7.

Clutch Plate Position Determined by Drive Plate

In this embodiment of the lockup device 7, the axial position of the clutch plate 71 with respect to the drive plate 72 is determined by means of the ring member 81. As a result, it is possible to position the friction coupling part 71c of the clutch plate 71 at a prescribed axial position between the piston 75 and the friction surface 11b of the front cover 11. Also, since the clutch plate 71 is supported by the drive plate 72 in the radial direction, the radial position of the clutch plate 71 is stable. Thus, it is difficult for drag torque to occur when the lockup device 7 is in the released state because the gaps that the friction coupling part 71c of the clutch plate 71 makes with respect to the friction surface 11b of the front cover 11 and the pressing part 75a of the piston 75 are secured. Relative rotation angle between drive plate and driven plate secured In this embodiment of the lockup device 7, the relative rotation between the drive plate 72 and the first driven plates 77 and 78 is limited to a prescribed angular range by means of the protrusions 72b of the drive plate 72 and the window parts 78d of the first driven plate 78. Consequently, the compression of the torsion springs 74 can be limited to a prescribed angular range and the desired torsional characteristic can be obtained.

Ease of Assembly Improved with Divided Driven Plate Structure

In this embodiment of the lockup device 7, the driven plate 73 is divided into the first driven plates 77 and 78 that hold the plurality of the torsion springs 74 and a second driven plate 79 that is fixed to the turbine 22. As a result, the lockup device can be assembled by first putting together an assemblage having the clutch plate 71, the torsion springs 74, the drive plate 72, and the first driven plates 77 and 78 (see FIG. 6) and then mating the second driven plate 79 (which is fixed to the turbine 22) to said the assemblage (see FIG. 7). Furthermore, by simply mating the second driven plate 79 with the first driven plates 77 and 78, the first driven plates 77 and 78 are put into a state of being supported in the radial direction by the second driven plate 79. In short, the axial positioning between the clutch plate 71 and the drive plate 72 can be adjusted in advance before installing the turbine 22. As a result, the ease of assembly of the lockup device 7 is improved.

Ease of Assembly of Piston Coupling Mechanism Improved

Referring again to FIG. 2 in this embodiment of the lockup device, the piston coupling mechanism 76 is configured such that the return plate 85 can be easily assembled to the cover lug plate 84 by moving the piston lug plate 83 and the return plate 85, which are fixed to the piston 75, in the axial direction toward the cover lug plate 84, which is fixed to the front cover 11. This arrangement improves the ease of assembly of the piston coupling mechanism 76. As a result, the ease of assembly of the lockup device 7 as a whole is improved.

Number of Parts of Piston Coupling Mechanism Reduced

In this embodiment of the lockup device 7, the number of parts making up the piston coupling mechanism 76 has been reduced because the piston coupling mechanism 76 basically has three members, a piston lug plate 85, a cover lug plate 84, and a return plate 85. As a result, the number of parts of the lockup device 7 as a whole can be reduced.

As used herein, the following directional terms "forward, rearward, above, downward, vertical, horizontal below, and transverse" as well as any other similar directional terms refer to those directions of a vehicle equipped with the present invention. Accordingly, these terms, as utilized to describe the present invention should be interpreted relative to a vehicle equipped with the present invention.

Second Embodiment

Alternate embodiments will now be explained. In view of the similarity between the first and alternate embodiments, the parts of the alternate embodiments that are identical or substantially identical to the parts of the first embodiment will be given the same reference numerals as the parts of the first embodiment. Moreover, the descriptions of the parts of the alternate embodiments that are identical to the parts of the first embodiment may be omitted for the sake of brevity.

Below, a second preferred embodiment of the present invention is described based on the drawings. This embodiment is the same or substantially the same as the first described embodiment except for some differences in the structure of the lockup device. The differences with respect to first embodiment are described.

(1) Structure of Lockup Device

Figure 8:
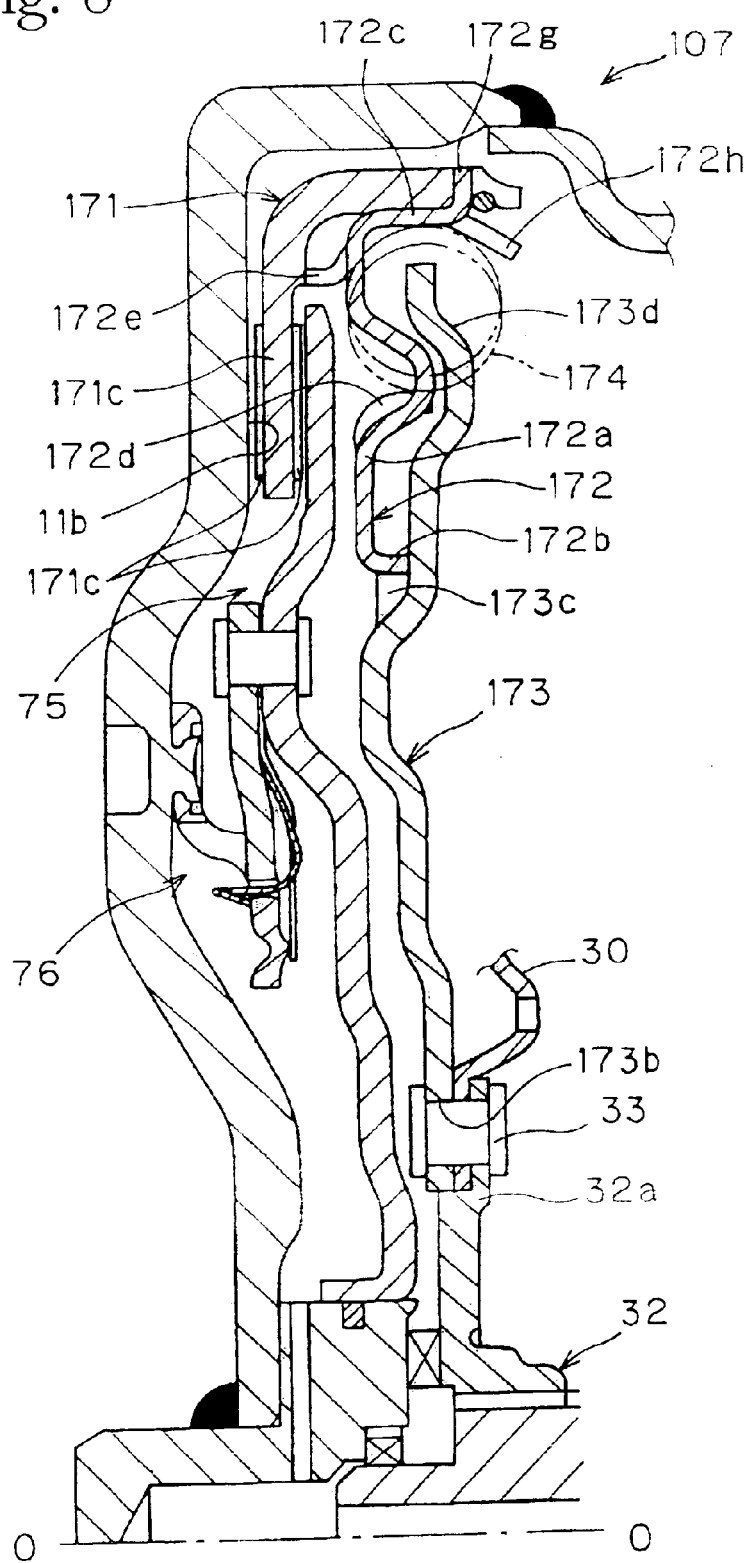
FIG. 8 is a view equivalent to that of FIG. 2 illustrating a lockup device in accordance with a second preferred embodiment of the present invention.
Figure 9:
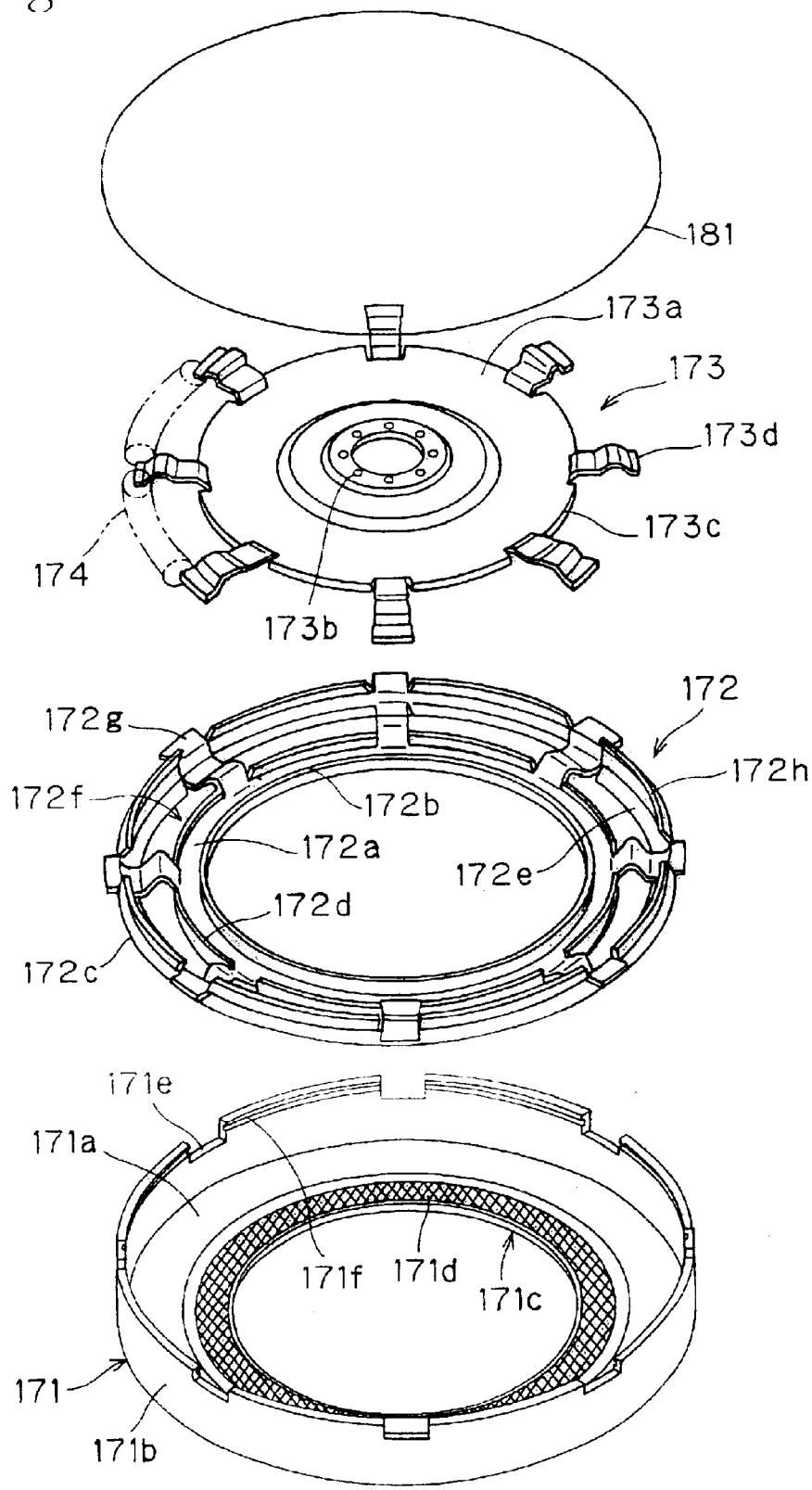
FIG. 9 is an exploded perspective view of components that are included in the lockup device of FIG. 2, such as, a clutch plate, a drive plate, a driven plate, and a ring member.

Referring initially to FIG. 8, similar to the first embodiment, a lockup device 107 chiefly has a clutch plate 171 (clutch member), a drive plate 172 (drive member), a driven plate 173 (driven member), a plurality of torsion springs 174 (elastic members), a piston 75, and a piston coupling mechanism 76. FIG. 8 illustrates the lockup device 107 for this embodiment and FIG. 9 is an exploded perspective view of the clutch plate 171, drive plate 172, driven plate 173, and the plurality of torsion springs 174 of the lockup device 107. The structures of the piston 75 and the piston coupling mechanism 76 are the same or substantially the same as in the first embodiment and their explanation is omitted here.

Driven Plate

Referring to FIGS. 8 and 9, the driven plate 173 is an annular plate member having an annular part 173a, a plurality of holes 173b, a plurality of protrusions 173c, and a plurality of claw parts 173d. The holes 173b are formed in an inner circumferential portion of the annular part 173a. The plurality (preferably eight in this embodiment) of protrusions 173c is arranged circumferentially on the outside edge of the annular part 173a and protrudes radially outward. Further, the plurality (preferably eight in this embodiment) of claw parts 173d is formed circumferentially between the protrusions 173c. The driven plate 173 is fixed along with the turbine shell 30 to the flange part 32a of the turbine hub 32 by a plurality of rivets 33 that pass through holes 173b.

Drive Plate

The drive plate 172 has an annular part 172a, a cylindrical part 172b, and a cylindrical part 172c. The cylindrical part 172b is formed on the radial inside edge of the annular part 172a and extends toward the transmission in the axial direction. The cylindrical part 172c is formed to the outside of the annular part 172a and extends toward the transmission in the axial direction.

The annular part 172a is provided with a plurality of cut-and-raised parts 172d and a plurality of cut-and-raised parts 172e. The cut-and-raised parts 172d are arranged circumferentially along roughly the middle (with respect to the radial direction) of the annular part 172a. The plurality of cut-and-raised parts 172e is formed on an outer circumferential portion of the annular part 172a. There are preferably eight cut-and-raised parts 172d in this embodiment and they are formed so as to point toward the transmission in the axial direction. The cut-and-raised parts 172e are arranged in positions corresponding to the circumferential position of the cut-and-raised parts 172d and are formed by cutting and raising an outer circumferential portion of annular part 172a toward the engine in the axial direction. A plurality (preferably eight in this embodiment) of window parts 172f (holding parts) whose openings face in the axial directions is formed radially between the cut-and-raised parts 172d and the cut-and-raised parts 172e. The portions of the annular part 172a that are located circumferentially between the window parts 172f and correspond to roughly the middle of the window parts 172f with respect to the radial direction protrude toward the transmission in the axial direction. The claw parts 173d of the driven plate 173 are arranged in positions circumferentially between window parts 172f. The internal surface of the cylindrical part 172b fits around the outside edge of the protrusions 173c of the driven plate 173 such that relative rotation is possible therebetween and radial direction positioning is accomplished.

The cylindrical part 172c has a plurality (preferably eight in this embodiment) of cut-and-raised parts 172g arranged circumferentially on the transmission facing edge part thereof and a plurality of slanted parts 172h disposed circumferentially between the cut-and-raised parts 172g. The cut-and-raised parts 172g are arranged in positions corresponding to the portions located circumferentially between the window parts 172f and are shaped as though a portion of the cylindrical part 172c were cut and bent radially outward. The slanted parts 172h (of which there are preferably eight in this embodiment) are portions formed by narrowing rotationally facing rim parts of the cut-and-raised parts 172g toward the inward radial direction.

Torsion Springs

The torsion springs 174 have a plurality of coil springs (preferably eight in this embodiment) arranged in the window parts 172f of the drive plate 172. The axially facing sides of the torsion springs 174 are supported by the cut-and-raised parts 172e and the slanted parts 172h of the drive plate 172. The radially inward facing side of each torsion spring 174 is supported by the cut-and-raised parts 172d. The rotationally facing ends of the torsion springs 174 are supported in either direction or through spring seats on the rotationally facing edge parts of the window parts 172f, which serves as the torque transmission parts. The rotationally facing ends of the torsion springs 174 also abut against the rotationally facing edges of the claw parts 173d of the driven plate 173. Thus, the torsion springs 174 are compressed rotationally between the drive plate 172 and the driven plate 173.

Clutch Plate

The clutch plate 171 functions chiefly as a friction coupling part that couples with and releases from the front cover 11. It is installed axially between the driven plate 173 and the front cover 11.

The clutch plate 171 is an annular plate member having an annular part 171a and a cylindrical part 171b (bearing part) that extends from the outside edge of the annular part 171a toward the turbine 22 in the axial direction. The inner circumferential portion of the annular part 171a constitutes a friction coupling part 171c and is in close proximity to the friction surface 11b of the front cover 11. The friction facings 171d are attached to both surfaces of the friction coupling part 171c. The cylindrical part 171b has a plurality (preferably eight in this embodiment) of recessions 171e formed in the transmission facing edge thereof so as to correspond to the cut-and-raised parts 172g of the drive plate 172. The cylindrical part 171b also has a plurality of groove parts 171f formed in the internal surface of the portions of the cylindrical part 171b circumferentially between the recessions 171e.

The cut-and-raised parts 172g mate with the recessions 171e such that relative rotation is not possible. A ring member 181, e.g., a wire ring or snap ring, fits into the grooves 171f. As a result, the cut-and-raised parts 172g are positioned to a prescribed axial position. In short, the clutch plate 171 is positioned to a prescribed position with respect to the drive plate 172 in the axial direction. The external surface of the cylindrical part 172c of the drive plate 172 fits against the internal surface of the cylindrical part 171b. As a result, the clutch plate 171 is positioned in the radial direction by the drive plate 172. Furthermore, the cylindrical part 171b becomes integral with the cylindrical part 172c of the drive plate 172 and bears the centrifugal load of the torsion springs 174.

(2) Assembly of Lockup Device

Figure 10:
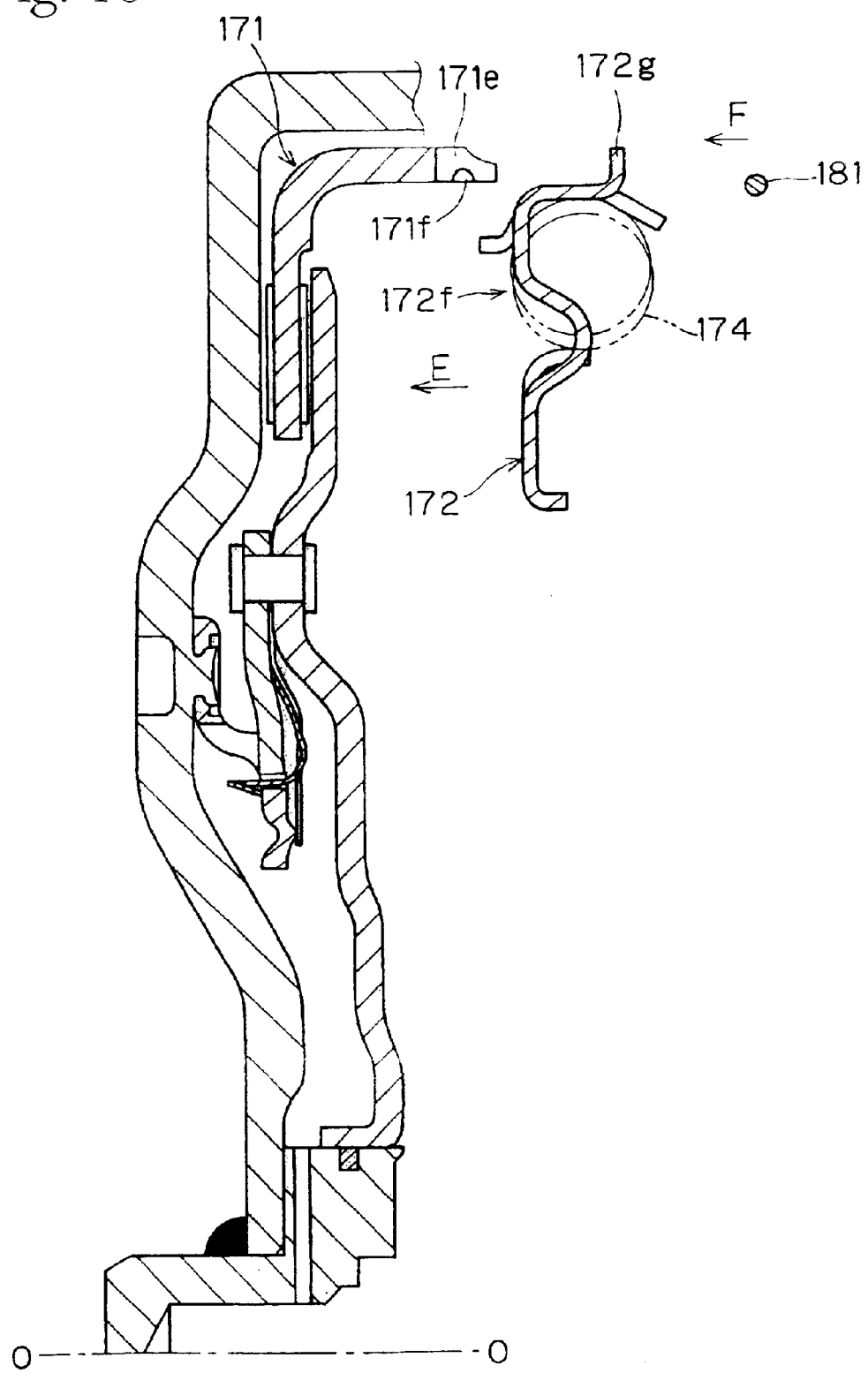
FIG. 10 illustrates the assembly of the drive plate to the clutch plate in the lockup device in accordance with a second preferred embodiment of the present invention.
Figure 11:
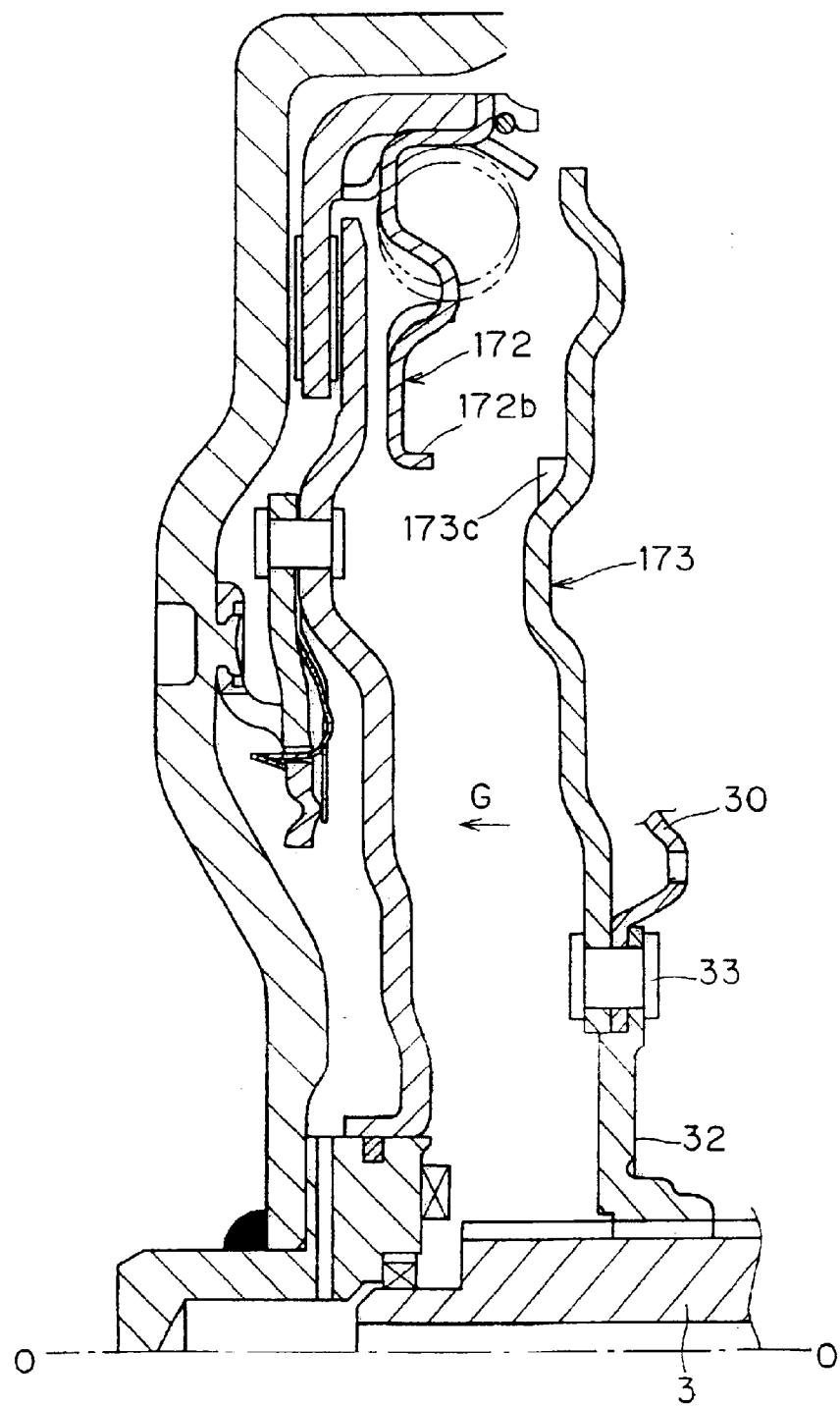
FIG. 11 illustrates the assembly of the driven plate to the drive plate in the lockup device in accordance with a second preferred embodiment of the present invention.

The assembly of the lockup device 107 is described with reference to FIGS. 10 and 11. FIG. 10 shows the assembly of the drive plate 172 to the clutch plate 171 and FIG. 11 shows the assembly of the driven plate 173 to the drive plate 172. The lockup device 107 is preferably assembled in the following order, assembly of the piston coupling mechanism 76, assembly of the drive plate 172 to the clutch plate 171, and assembly of the driven plate 173 to the drive plate 172. Each procedure is explained below. However, explanation of the assembly of the piston coupling mechanism 76 is omitted because it is the same or substantially the same as described in the first embodiment.

Assembly of Drive Plate to Clutch Plate

As shown in FIG. 10, the first torsion springs 174 are installed into the drive plate 172. More specifically, the torsion springs 174 are arranged in the window parts 172f of the drive plate 172. Next, the drive plate 172 is mated with the clutch plate 171 from the direction of arrow E. More specifically, the cut-and-raised parts 172g of the drive plate 172 are mated with recessions 171e of the clutch plate 171 such that the two plates 171 and 172 cannot rotate relative to each other. Then, the ring member 181 is fitted into the grooves 171f of the clutch plate 171 from the direction of arrow F such that the drive plate 172 and the clutch plate 171 become a single, integral unit.

Assembly of Driven Plate to Drive Plate

As shown in FIG. 11, the driven plate 173 is attached along with the turbine shell 30 to the turbine hub 32 with the rivets 33. Then, the internal part of the turbine hub 32 is fitted over the external part of the input shaft 3 from the direction of arrow G and the driven plate is mated with the drive plate 172. More specifically, the protrusions 173c of the driven plate 173 are mated with the cylindrical part 172b of the drive plate 172 such that the two plates 172 and 173 cannot rotate relative to each other. As a result, the drive plate 172 is positioned in the radial direction by the driven plate 173.

(3) Features of Lockup Device

This embodiment of the lockup device, i.e., the lockup device 107, has basically the same or similar features as the lockup device described in the first embodiment, i.e., the lockup device 7. Below, the features that are different from the first embodiment are described.

Centrifugal Load of Torsion Springs Born by Clutch Plate

Figure 12:
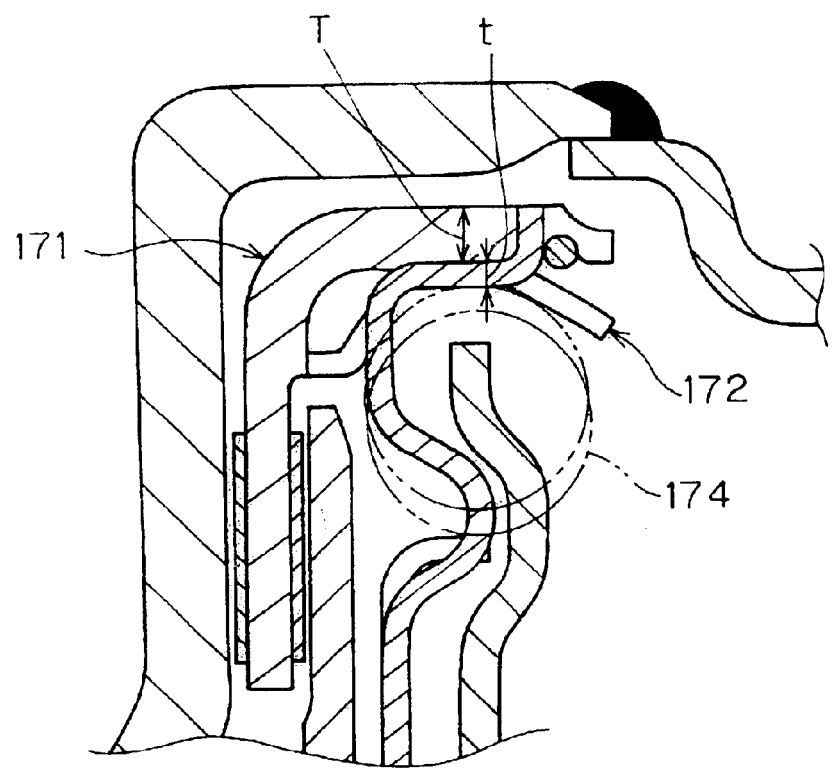
FIG. 12 is an enlarged partial view of FIG. 8 illustrating the vicinity of a radially outward facing portion of a torsion spring of the lockup device.

In this embodiment of the lockup device 107, similar to the first embodiment, the clutch plate 171 (clutch member) bears the centrifugal load of the torsion springs 174 (elastic members). The difference with respect to first embodiment is that the clutch plate 171 does not support the radially outward facing part of the torsion springs 174 directly; rather, it supports the springs 174 as an integral unit with the drive plate 172. More specifically, as shown in FIG. 12, the thickness t of the drive plate 172 is sufficient to bear the axially facing sides and the radially inward facing side of each torsion spring 174, but thickness t is not sufficient for the drive plate 172 alone to bear the centrifugal load of the torsion springs 174. Instead, the thickness T of the clutch plate 171 is made large and the plates 171 and 172 are arranged such that the clutch plate 171 and the drive plate 172 bear the centrifugal load of the torsion springs 174 together. Therefore, similar to the first embodiment, it is possible to arrange the torsion springs 174 on the outside with respect the radial direction. Furthermore, the weight of the lockup device 107 can be reduced because the thickness of the drive plate 172 can be reduced.

Radial Position of Drive Plate Determined by Driven Plate

In this embodiment of the lockup device 107, the drive plate 172 is positioned in the radial direction by the driven plate 173. As a result, the radial position of the drive plate 172 with respect to the driven plate 173 is stable.

Number of Parts Reduced

In this embodiment of the lockup device 107, the centrifugal load of the torsion springs 174 is essentially born by the clutch plate 171 and the portions of the torsion springs 174 other than radially outward facing part are born by the drive plate 172. As a result, the number of parts can be reduced to a smaller number than the lockup device 7 of the first embodiment.

Heat Treatment of Clutch Plate Omitted

In the first embodiment it is necessary to heat-treat the portions where the clutch plate 71 and the torsion springs 74 slide against each other. In this embodiment, the heat treatment of the clutch plate 171 can be omitted because the sliding takes place between drive plate 172 and torsion springs 174.

Other Embodiments

Embodiments of the present invention have been described based on the drawings, but the specific features of the present invention are not limited to those of the previously described embodiments. Modifications are possible so long as the gist of the invention is not exceeded.

For example, instead of being applied to a torque converter (as in the previously described embodiments), the lockup device of the present invention can be applied to a fluid coupling or other fluid-type torque transmission device.

Effects of the Invention

In the lockup device of the present invention, the centrifugal load of the elastic member is born by providing the clutch member with a bearing part for bearing the centrifugal load of the elastic member. Consequently, there is no need to provide the drive member or driven member with a section that enables it to bear the radially outward facing part of the elastic member by itself and the elastic member can be arranged on the outside with respect to the radial direction. As a result, the capacity of the lockup device to absorb and damp torsional vibrations can be improved.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-073008. The entire disclosure of Japanese Patent Application No. 2002-073008 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lockup device for a fluid-type torque transmission device comprising:
   a clutch member having a friction coupling part being configured to be pressed against a friction surface of a front cover of the fluid-type torque transmission device, said clutch member having a bearing part;
   a drive member being configured to mate non-rotatably with said clutch member;
   a driven member being fixed to a turbine of the fluid-type torque transmission device;
   an elastic member being configured to couple elastically said drive member and said driven member together in a rotational direction, said bearing part being configured to bear a centrifugal load of said elastic member;
   a piston being arranged between said front cover and said turbine, said piston being configured to press said friction coupling part against said friction surface; and
   a ring member being installed in a section where said drive member and said clutch member mate.

2. The lockup device according to claim 1, ring member is configured to position said clutch member at a prescribed axial position with respect to said drive member.

3. The lockup device according to claim 2, wherein said clutch member is positioned in a radial direction by said drive member.

4. The lockup device according to claim 3, wherein said driven member limits rotation of said drive member to a prescribed angular range when said drive member rotates relative to said driven member.

5. The lockup device according to claim 4, wherein a radially outward facing part of said elastic member contacts a radially internal surface of said bearing part.

6. The lockup device according to claim 5, wherein
   said driven member comprises,
      a first driven member that holds said elastic member, and
      a second driven member that is fixed to said turbine and non-rotatably and axially movably mates with said first driven member.

7. The lockup device according to claim 2, wherein said driven member limits rotation of said drive member to a prescribed angular range when said drive member rotates relative to said driven member.

8. The lockup device according to claim 7, wherein a radially outward facing part of said elastic member contacts a radially internal surface of said bearing part.

9. The lockup device according to claim 8, wherein
   said driven member comprises,
      a first driven member that holds said elastic member, and a second driven member that is fixed to said turbine and non-rotatably and axially movably mates with said first driven member.

10. The lockup device according to claim 1, wherein said clutch member is positioned in a radial direction by said drive member.

11. The lockup device according to claim 10, wherein said driven member limits rotation of said drive member to a prescribed angular range when said drive member rotates relative to said driven member.

12. The lockup device according to claim 11, wherein a radially outward facing part of said elastic member contacts a radially internal surface of said bearing part.

13. A lockup device for a fluid-type torque transmission device comprising:
- a clutch member having a friction coupling part being configured to be pressed against a friction surface of a front cover of the fluid-type torque transmission device, said clutch member having a bearing part;
- a drive member being configured to mate non-rotatably with said clutch member;
- a driven member being fixed to a turbine of the fluid-type torque transmission device said driven member including,
  said driven member, and
  a second driven member being fixed to said turbine and mating non-rotatably and axially movably with said first driven member;
- an elastic member being configured to coupled elastically said drive member and said driven member together in a rotational direction, said bearing part being configured to bear a centrifugal load of said elastic member, said elastic being configured to be held by said first driven member; and
- a piston being arranged between said front cover and said turbine, said piston being configured to press said friction coupling part against said friction surface.

14. The lockup device according to claim 13, wherein said driven member limits rotation of said drive member to a prescribed angular range when said drive member rotates relative to said driven member.

15. The lockup device according to claim 14, wherein a radially outward facing part of said elastic member contacts a radially internal surface of said bearing part.

16. The lockup device according to claim 13, wherein a radially outward facing part of said elastic member contacts a radially internal surface of said bearing part.

17. The lockup device according to claim 13, wherein said first driven member is positioned in a radial direction by said second driven member.

18. The lockup device according to claim 13, wherein
said drive member comprises a holding part that holds said elastic member; and
a supporting portion of said holding part supports a radially outward facing part of said elastic member, said supporting portion of said holding part contacts an internal surface of said bearing part.

19. The lockup device according to claim 18, wherein said drive member is positioned in a radial direction by said driven member.

20. The lockup device according to claim 13, wherein said drive member is positioned in a radial direction by said driven member.

* * * * *